United States Patent [19] | [11] Patent Number: 4,887,645
Kerger | [45] Date of Patent: Dec. 19, 1989

[54] CONTROL STATION FOR PRESSURIZED GASES

[75] Inventor: Leon Kerger, Helmdange, Luxembourg

[73] Assignee: Ceodeux S.A., Lintgen, Luxembourg

[21] Appl. No.: 361,793

[22] Filed: May 30, 1989

Related U.S. Application Data

[63] Continuation of Ser. No. 166,131, Mar. 9, 1988, abandoned.

[30] Foreign Application Priority Data

Mar. 9, 1987 [LU] Luxembourg ........................... 86802

[51] Int. Cl.[4] ............................................. F16K 11/00
[52] U.S. Cl. ................................. 137/884; 137/561 R
[58] Field of Search ..................... 137/561 R, 602, 884

[56] References Cited

U.S. PATENT DOCUMENTS 4,453,565 6/1984 Neff ................................ 137/884 X
4,703,913 11/1987 Humhajuller ................... 137/884 X
4,714,091 12/1987 Wagner ...................... 137/561 R X

*Primary Examiner*—John Fox
*Attorney, Agent, or Firm*—Leydig, Voit & Mayer

[57] ABSTRACT

The station is intended for regulating the flow of a gas to a working circuit and for this purpose is connected to at least one reservoir of compressed or liquefied gas and to a reservoir of scavenging gas and comprises a certain number of accessories for control, regulation and monitoring. The station is designed in the form of a compact unit block comprising, on its surface, standard connections in which all the accessories are screwed or welded sealingly and which are connected to one another in a logical and appropriate way by means of conduits made through the block by machining.

1 Claim, 8 Drawing Sheets

CONTROL STATION FOR PRESSURIZED GASES

This is a continuation of application Ser. No. 166,131 filed on Mar. 9, 1988, now abandoned.

The present invention relates to a control station for regulating the flow of a pressurized gas towards a working circuit, connected to at least one reservoir of compressed or liquefied gas and to a reservoir of scavenging gas and comprising a certain number of accessories for control and monitoring.

Although not being limited to this, the invention is aimed more particularly at a control station for gases of extra-high purity used, for example, in the production of optical fibres or in the technology of semiconductors, especially for doping these. These gases must be of virtually absolute purity, since the slightest solid, liquid or gaseous impurity can disrupt the process of doping and producing these highly sensitive materials. In particular, these gases must pass from the gas bottle towards the place of use through pipes, connections, pressure-reducing valves, taps, etc. in the initial state of purity, that is to say it is necessary to ensure that the gas, during its passing through the circuits of the control station, does not carry with it moisture or substances orinorganic materials detrimental to the use of these gases, particularly as a result of absorption or disorption effects, when it is in contact with the circuits through which it passes.

The reservoirs or bottles of gas are usually connected to the working circuit by means of a control station consisting of a panel on which are mounted the various control components, particularly the taps, pressure-reducing valves and other accessories connected to the circuit by means of screwed or welded connections. The circuit also has to be connected to a bottle or a circuit containing a neutral scavenging gas, so that the circuits are scavenged thoroughly between each change of gas bottle in order to remove the impurities which may infiltrate via the atmospheric air. Furthermore, the circuit is preferably connected to a vacuum pump in order to extract the scavenging gas after each scavenging operation.

Now the assembly of such a control station presents a risk of contamination of the gases beyond the acceptable limit because of the numerous screwed and welded connections, the bends of the pipes and the size of the dead or wasted spaces.

To reduce this risk and meet the increasingly stringent purity criteria set by the users, the present invention provides a new control station of the type described in the introduction, which is characterized by at least one compact unit block having, on its surface, standard connections in which all the accessories are screwed or welded sealingly and which are connected to one another in a logical and appropriate way by means of conduits made through the block by machining.

A control station designed in this way no longer has any welded connection and the length of the communications between the various active components, that is to say the dead spaces, are reduced to a minimum. Furthermore, the assembly of such a station no longer requires any or virtually any pipe-bending operations which are always difficult because, if the acceptable radius of curvature is not adhered to, there is a risk that the innersurfaces of the pipes will be damaged.

Moreover, the control station provided by the present invention is much less bulky than known stations, and it is assembled more simply and more quickly.

According to the first embodiment, the station can comprise a first block arranged between the working circuit and the reservoir of compressed or liquefied gases and a second block connected between the first block and the scavenging gas reservoir.

According to another embodiment, these two blocks can also be incorporated in a single complex block.

It is advantageous to provide means for sealingly closing off the unused connections and conduits of each block. This makes it possible to produce standard blocks and organise the circuit as desired, during its assembly, by closing off the superfluous connections.

The block connected to the working circuit also preferably possesses a connection for connecting to a vacuum pump and/or a connection for a leak detector.

The invention will be explained in more detail below, by means of some preferred embodiments described by way of illustration, with reference to the accompanying drawings, in which.

Figure 1:
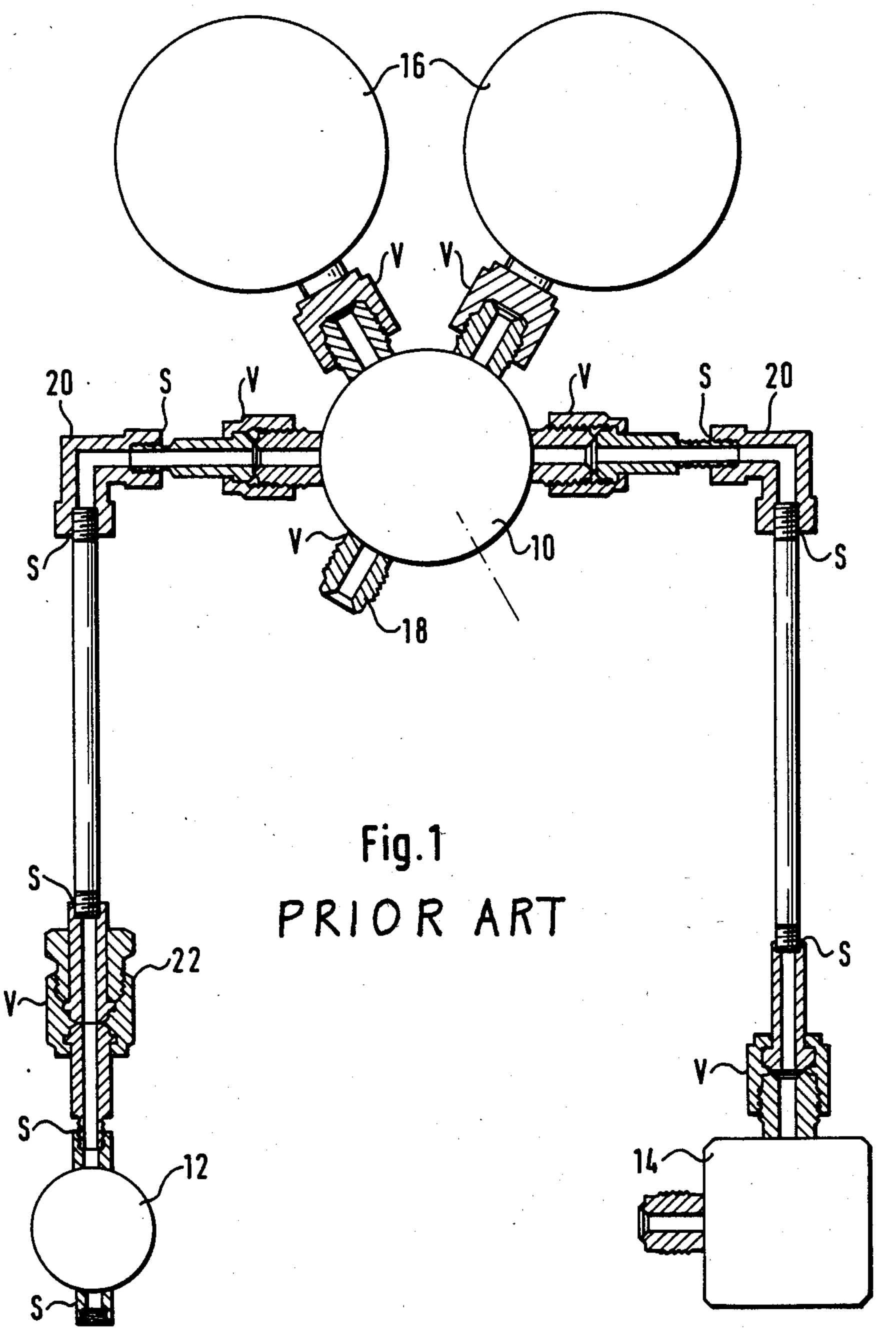
Fig. 1 PRIOR ART
FIG. 1 shows a diagrammatic view of a conventional assembly which can be fitted to a scavenging-gas bottle.

The conventional assembly of FIG. 1 comprises a pressure-reducing valve 10 connected upstream, via a tap 2, to a bottle of neutral scavenging gas and downstream, via a preferably pneumatically controlled tap 14, to the circuit to be scavenged. The pressure-reducing valve is associated with one or two pressure gauges 16, a pressure switch 18 and, if appropriate, a safety valve (not shown). Assembly is carried out on the spot by means of straight pipes, bent connections 20 and straight connections 22. Because of the bent connections 20, there is no need to bend the pipes, with the attendant risks, but on the other hand each connection 20 requires a weld on either side. Moreover, all the welds required as a result of this assembly are represented by "S", whilst all the screwed connections are represented by "V".

As can be seen, this circuit of FIG. 1, although being relatively simple, requires a large number of welded or screwed connections, and this, in addition to the wasted spaces formed by the straight and bent connections and the connecting pipes, increases the risks of contamination, in this particular case contamination of the scavenging gases which can carry impurities with them into the circuits to be scavenged.

Figure 2:
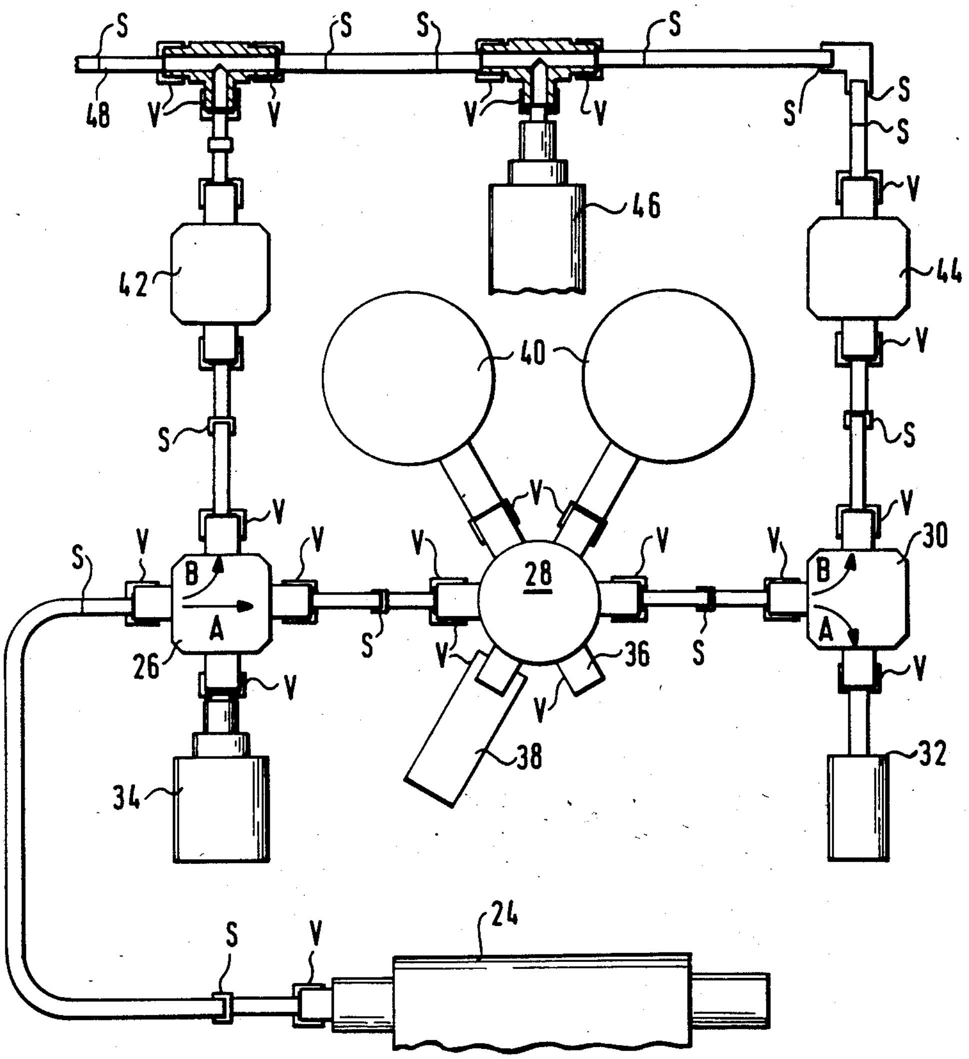
Fig. 2 PRIOR ART
FIG. 2 shows a diagrammatic view of a conventional assembly for controlling the flow of gas of extrahigh purity to a working circuit.

The known assembly shown in FIG. 2 serves for regulating and monitoring the flow of gas of extra-high purity to a working circuit. The circuit illustrated in FIG. 2 is connected to a gas bottle (not shown) by means of a flow switch 24. This gas is directed towards a pressure-reducing valve 28 via a two-way tap 26, controlled pneumatically in the example shown, and open in the direction represented by the arrow "A". The gas expanded to the working pressure in 28 is subsequently conveyed into the working system (not shown) via anotherpneumatically controlled two-way tap 30 open in the direction of the arrow "A" and via a filter 32. The tap 26 and the pressure-reducing valve: 28 can be associated with pressure switches 34 and 36. The pressure-reducing valve 28 is also associated with a safety valve 38 and with pressure gauges 40 for checking the pressure upstream and downstream of the pressure-reducing valve 28.

During the replacement of an empty gas bottle, the scavenging of the circuit must be carried out after disconnecting this and before connecting a new bottle. For this purpose, the circuit of FIG. 2 is connected, upstream of the contactor 24, to the tap 14 of the scavenging circuit of FIG. 1. The scavenging gas follows the same path as that described above, with the exception of the tap 30 which is switched to the passage indicated by the arrow B, in order to prevent the scavenging gas from entering the working circuit.

As shown in FIG. 2, a circuit comprising two pneumatically or manually controlled taps 42, 44 and a pressure switch 46 is connected in parallel to the circuit described above at the two-way taps 26 and 30. This circuit is connected at 48 to a vacuum pump (not shown) and, after the scavenging operation, serves for discharging the residues of scavenging-gas of the entire circuit by connecting the two taps 26 and 30 to the passage represented by the arrow B. After this discharge, the tap of the new gas bottle can be opened.

Figure 3:
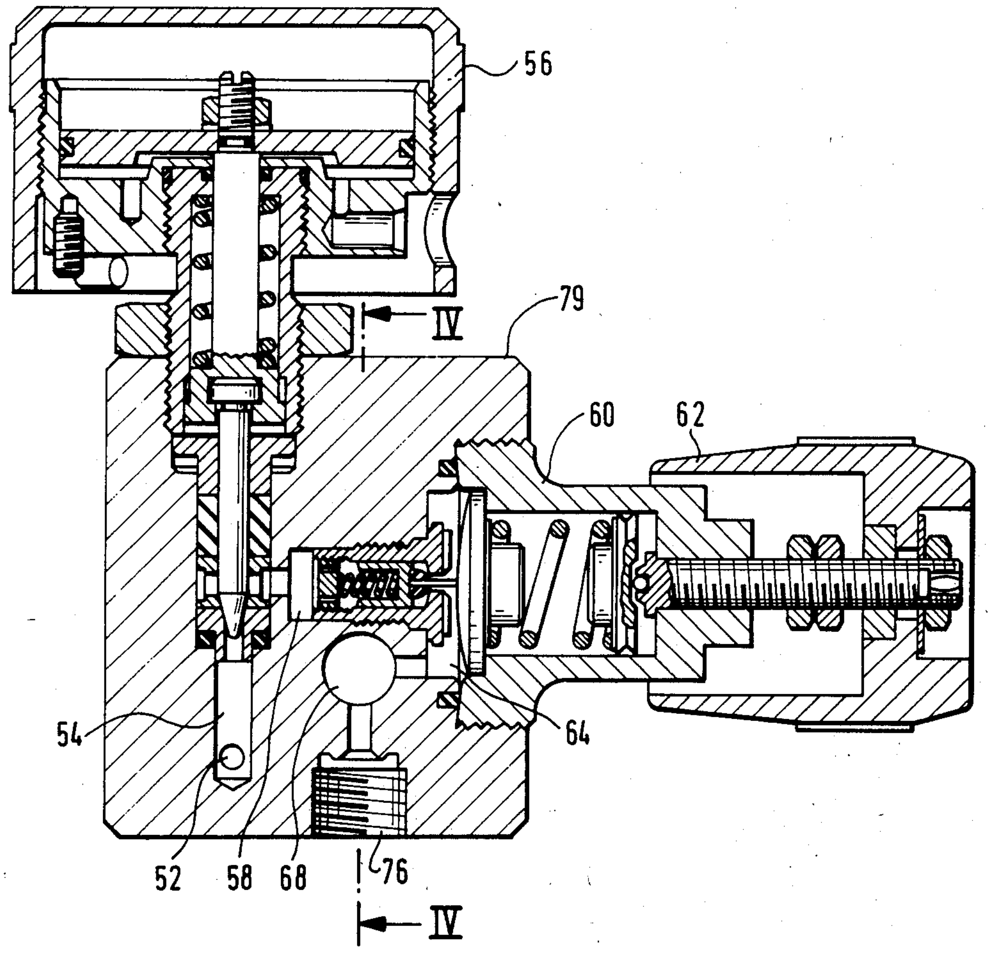
FIG. 3 shows diagrammatically a section through a control block according to the present invention.
Figure 4:
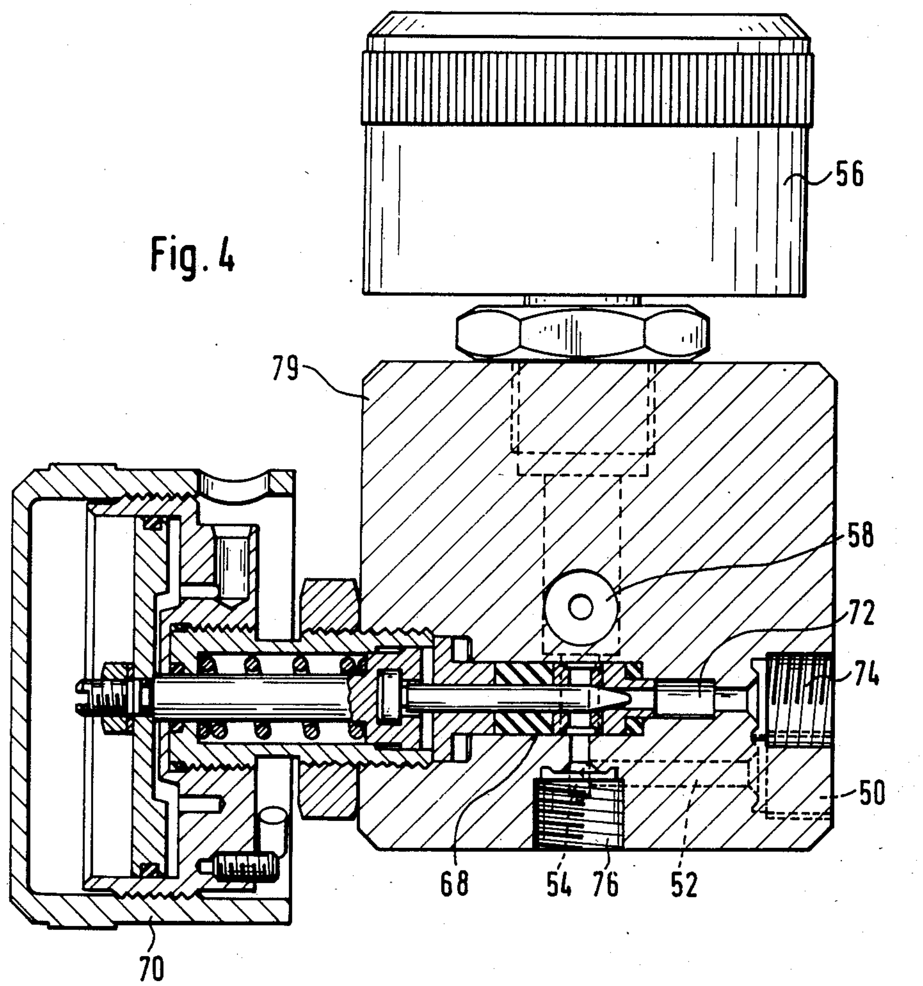
FIG. 4 shows the block of FIG. 3 in the sectional plane IV—IV.
Figure 5:
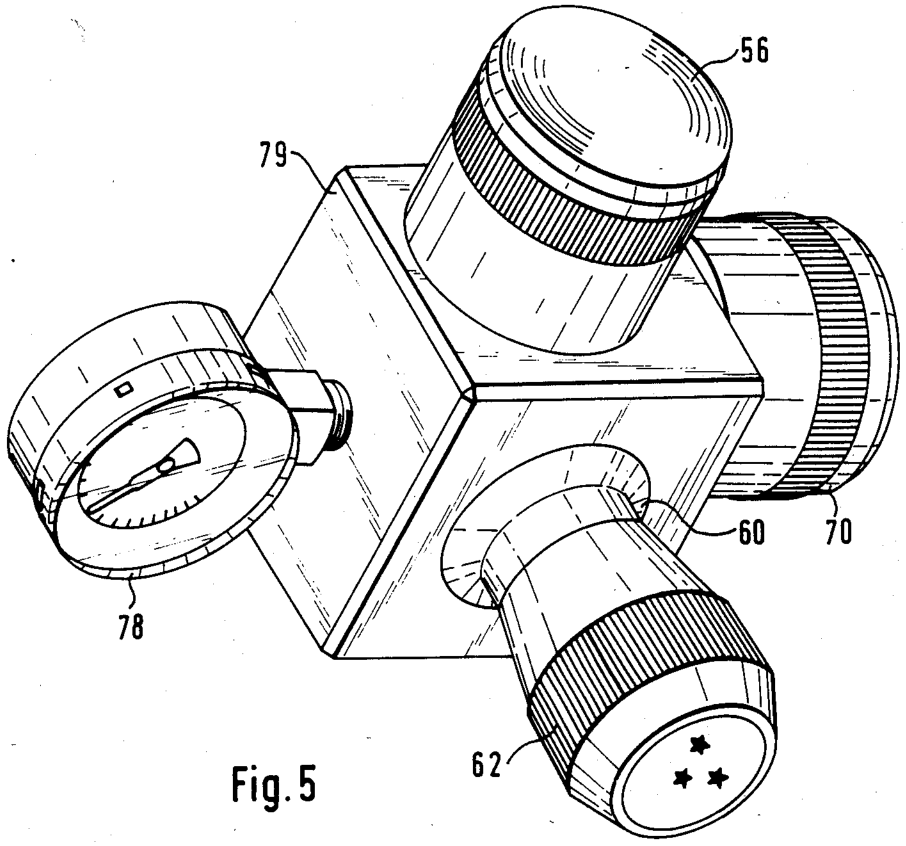
FIG. 5 shows a perspective view of the control block according to FIGS. 3 and 4.
Figure 6:
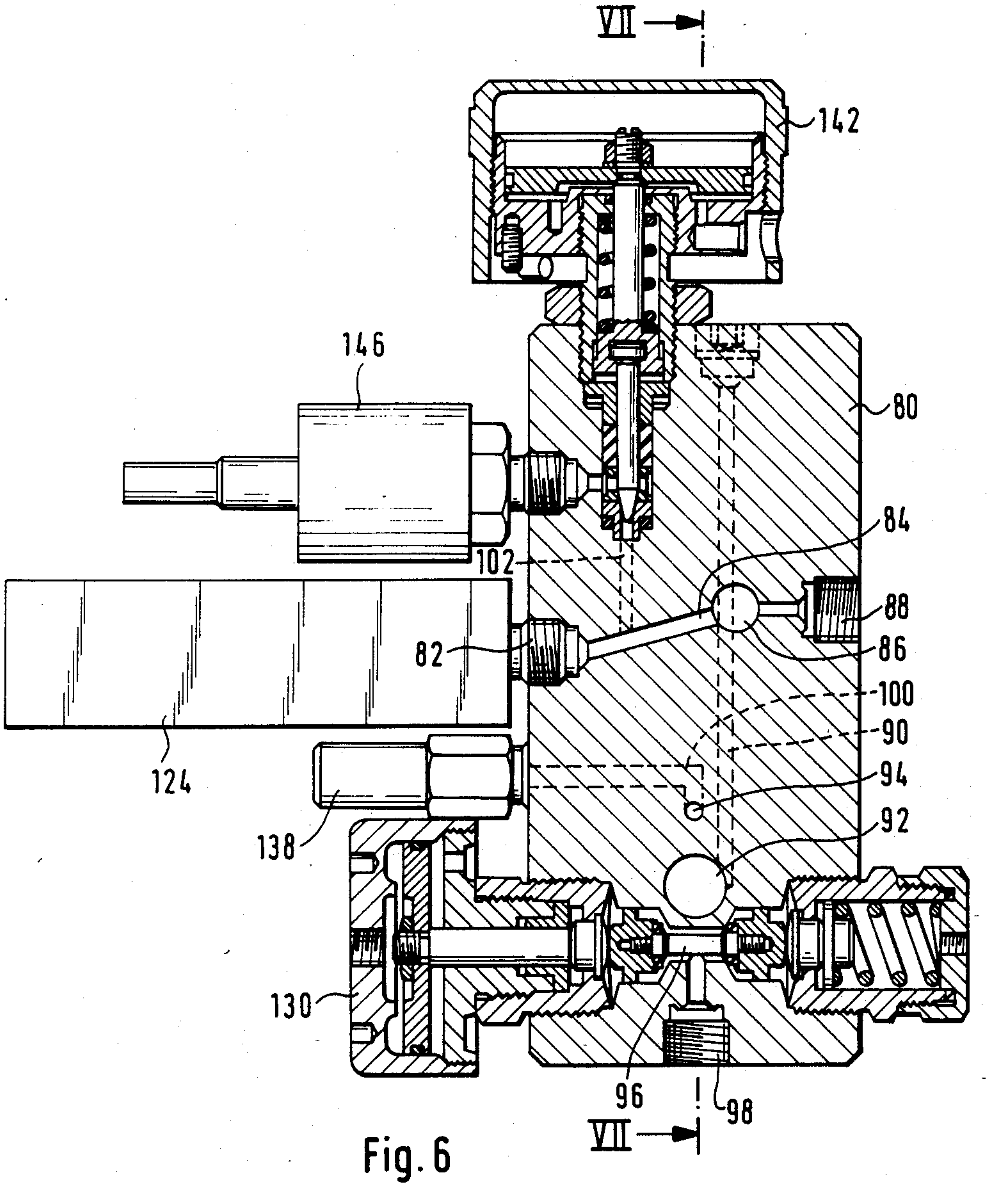
FIG. 6 is a partially sectional view of a second embodiment of a control block according to the present invention.
Figure 7:
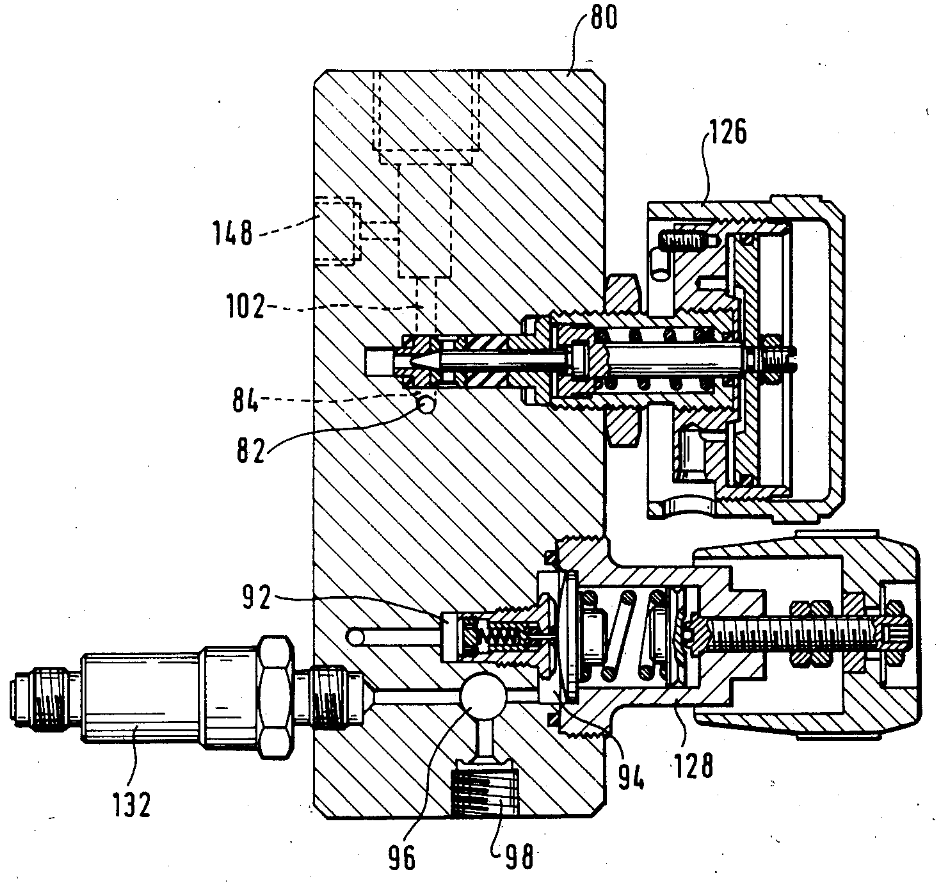
FIG. 7 shows the control block of FIG. 6 in the sectional plane VII—VII.
Figure 8:
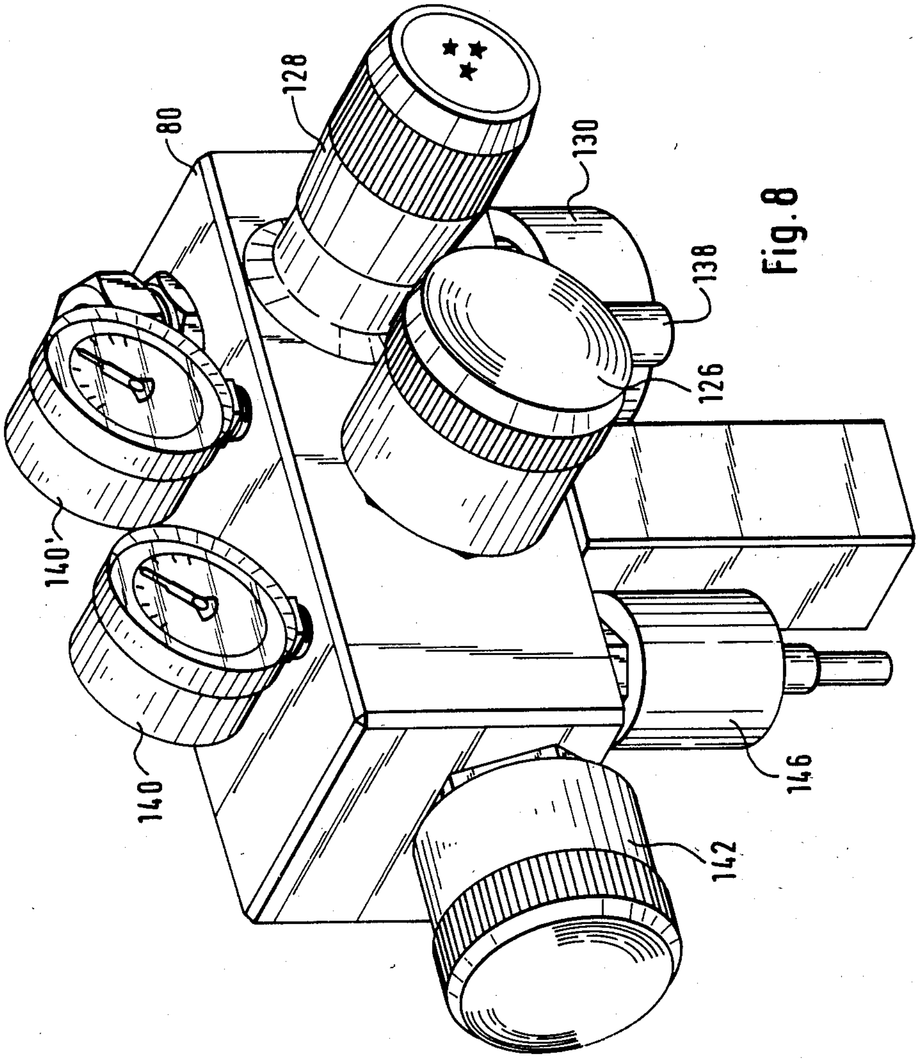
FIG. 8 shows a perspective view of the embodiment of the control block according to FIGS. 7 and 8.

The present invention proposes replacing the control station according to FIGS. 1 and 2 by compact unit blocks, and FIGS. 3 to 5 on the one hand and FIGS. 6 to 8 on the other hand show examples of an embodiment of two blocks for replacing the circuits of FIGS. 1 and 2 respectively.

The block 79 illustrated in FIGS. 3 to 5 has a connection 50, represented by broken lines in FIG. 4, for connection to a bottle of scavenging gas. From this connection 50, the gas passes through a conduit 52, likewise represented by broken lines in FIG. 4, finally arriving in the inlet conduit 54 (see FIG. 3) of a pneumatically controlled tap 56 which is screwed sealingly in the block 79. However, this tap 56 is optional and corresponds to a tap which would be incorporated in the circuit of FIG. 1 between the tap 12 and the pressurereducing valve 10. When this tap 56 is in the open position, gas enters the inlet compartment 58 of a pressure-reducing valve 60 known per se, likewise screwed on the single block 79. The gas, during its passage through this pressure-reducing valve, experiences a fall in pressure, the amount of which is preset by means of the activating knob 62. From the outlet compartment 64 of this pressure-reducing valve 60, the gas enters a bore 68 in the single block 79, into which is screwed another pneumatically controlled tap 70 corresponding to the tap 14 of FIG. 1. The outlet conduit 72 of this tap 70 communicates directly with an outlet connection 74 located right next to the inlet connection 50 (see FIG. 4).The pressure at the outlet of the pressure-reducing valve 60 can be monitored by means of a pressure gauge 78 screwed to a connection 76 which communicates directly, via the body of the tap 70, with the outlet compartment 64 of the pressure-reducing valve 60. This pressure gauge 78 corresponds to one of the pressure gauges 16 shown in FIG. 1. It is also possible to provide a second pressure gauge (not shown) for monitoring the pressure at the inlet of the pressure-reducing valve 60. For this purpose, it is sufficient to machine in the block 79, next to the connection 74, another connection which communicates with the inlet compartment 58 of the pressure-reducing valve 60 and into which this second pressure gauge could be screwed.

As can be seen, the block illustrated in FIGS. 3 to 5 no longer has any weld and all the connecting pipes and connections are replaced by conduits or connections machined by drilling, lathe-turning or milling in the compact block 79 which possesses all the actuating and monitoring components shown in FIG. 1. Furthermore, all the spacings are reduced to a minimum and the gas flows from the inlet 50 to the outlet 74 along the shortest path.

The control block according to FIGS. 3 to 5 is installed easily and quickly, and much less skill is required than for assembling the circuit of FIG. 1. If the tap 56 is not needed, such as, for example, in FIG. 1, it is sufficient to close off the connection reserved for this tap by means of a seal provided for this purpose.

The block 80 shown in FIGS. 6 to 8, which is a little more complex than that of FIGS. 3 to 5, allows a compact assembly of the circuit of FIG. 2. To make the comparison easier, the reference numerals of FIG. 2, increased by "100" will be used. The flow switch 124 (see FIGS. 6 to 8) corresponding to the switch 24 of FIG. 2 is screwed to a connection 82 of the block 80 and is connected upstream to a bottle of pressurized gas. The gas enters the block 80 via an oblique conduit 84 and enters a bore 86, in which a pneumatically controlled tap 126 is screwed. This bore 86 also communicates, on the opposite side to the switch 124, with a connection 88, in which a pressure gauge 140 is screwed in order to monitor the pressure of the gas before expansion. A conduit 90 connects the outlet of the tap 126 to the inlet compartment 92 of a pressure-reducing valve 128. It should be noted that the conduit 92 must extend up to the outer face of the block 80 in order to meet machining requirements. However, the extension of the conduit 90 beyond the bore 86 can be closed off if it is not used.

The expansion of the gas takes place during passage through the pressure-reducing valve 128 between the inlet compartment 92 and the outlet compartment 94. This outlet compartment 94 is connected to the inlet 96 of a pneumatically controlled tap 130 which, in the example illustrated, is a tap which can be two-way or three-way in operation, but which, still in the example illustrated, has only a two-way operation. The pressure at the outlet of the pressure-reducing valve 128 can be monitored by means of a pressure gauge screwed to the connection 98 and communicating with the inlet of the tap 130 or, as shown in FIG. 8, by means of a pressure gauge 140' connected to the inside of the block 80, via a conduit (not shown), to the outlet compartment 94 of the pressure-reducing valve 128.

When the tap 130 is opened, the gas can leave the block 80 via a filter 132 (see FIG. 7) connected to the block 80 on the face not visible in FIG. 8.

The reference 138 denotes a safety valve which communicates, via a conduit 100, with the outlet compartment 94 of the pressure-reducing valve 128.

The scavenging of the block 80 and of the components connected to it is carried out in the same way as the scavenging operation of the circuit of FIG. 2. For this purpose, the block 80 connected upstream of the contactor 124 to the outlet 74 of the block of FIG. 4 is put in communication with the latter as a result of the opening of its taps, and the scavenging gas follows the same path as described above, all the taps being open, with the exception of the tap 130 which will be closed to prevent the scavenging gas from escaping into the working circuit. The outlet of the scavenging gas can be via the connection 98 or, if this is occupied by a pressure gauge, via the second outlet of the tap 130 which, in this case, will be designed as a three-way tap.

The block 80 is also designed so that it can be connected to a vacuum pump in order to extract the residues of the scavenging gases. The connection with the vacuum pump is made by means of the connection 148 (see FIG. 7) located on the face which cannot be seen in FIG. 8. This connection 148 communicates with the inlet of a pneumatically controlled tap 142, the outlet of which is connected via a conduit 102 to the inlet conduit 84 for the working gas or scavenging gas. A pressure switch 146 connected to the inlet of the tap 142 automatically controls the closing of the latter when the control block is emptied under the action of the vacuum pump.

The block illustrated in FIGS. 6 to 8 is likewise produced entirely by machining. The assembly of the control station according to the present invention therefore involves merely fastening the two blocks described above to a suitable panel provided for this purpose and screwing the various components to it. It is thus possible to standardize the production of these blocks by limiting them to several models which are delivered with all the connections closed off by means of sealing plugs. The fitter of the control station, after selecting the appropriate block, then simply has to free the connections which he needs in order to introduce the components required for the intended circuit into it, whilst the connections which cannot be used can remain closed off.

Alternatively, it is possible to combine the two blocks of FIGS. 3 to 5 and 6 to 8 into a single complex block.

The blocks 79 and 80 are preferably made of stainless steel, but if appropriate could also be made of synthetic material.

The taps and other accessories, instead of being screwed onto the connections of the blocks, can also be welded to them.

I claim:

1. A gas flow system having a working circuit, having a reservoir of compressed or liquefied gas, having a reservoir of scavenging gas, having a first group of accessories for control, regulation and monitoring of said compressed or liquefied gas, having a second group of accessories for control, regulation and monitoring of said scavenging gas, and having a control station for mounting said accessories, said system being characterized in that said control station comprises a first compact unit block having a single inlet connected to said reservoir of compressed or liquefied gas and having a single outlet connected to said working circuit, said first group of accessories comprising a first pressure reducing valve for controlling the pressure of the compressed or liquefied gas flowing out of the first block, said first block comprising, on its surface, standard connections in which all of said accessories of said first group are screwed or welded sealingly, conduits formed through said first block by machining and connecting the accessories of said first group to one another in a logical and appropriate way to allow the selective flow of compressed or liquefied gas through said first block from the inlet of the first block to the outlet thereof while enabling said first pressure reducing valve to control the pressure of the compressed or liquefied gas flowing out of the outlet of the first block, said station further comprising a second and separate compact unit block having a single inlet connected to said reservoir of scavenging gas and having a single outlet connected to said first block, said second group of accessories comprising a second pressure reducing valve for controlling the pressure of the scavenging gas flowing out of the outlet of said second block and flowing to said first block, said second block comprising, on its surface, standard connections in which all of said accessories of said second group are screwed or welded sealingly, and conduits formed through said second block by machining and connecting the accessories of said second block to one another in a logical and appropriate way to allow the selective flow of scavenging gas through said second block from the inlet of the second block to the outlet thereof while enabling said second pressure reducing valve to control the pressure of the scavenging gas flowing out of the outlet of said second block and flowing to said first block.

* * * * *